(12) United States Patent
Okubo (10) Patent No.: US 11,689,677 B2
(45) Date of Patent: Jun. 27, 2023

(54) INFORMATION PROCESSING APPARATUS, CONTROL METHOD FOR THE INFORMATION PROCESSING APPARATUS, AND A STORAGE MEDIUM

(71) Applicant: CANON KABUSHIKI KAISHA, Tokyo (JP)

(72) Inventor: Yuzuru Okubo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/590,075

(22) Filed: Feb. 1, 2022

(65) Prior Publication Data

US 2022/0263966 A1  Aug. 18, 2022

(30) Foreign Application Priority Data

Feb. 18, 2021  (JP) ................. 2021-024214

(51) Int. Cl.
*H04N 1/00* (2006.01)
*G06F 3/12* (2006.01)

(52) U.S. Cl.
CPC ....... *H04N 1/00965* (2013.01); *G06F 3/1204* (2013.01); *G06F 3/1253* (2013.01)

(58) Field of Classification Search
None
See application file for complete search history.

(56) References Cited

U.S. PATENT DOCUMENTS

| 10,452,324 | B2 | 10/2019 | Okubo | |
| 2019/0205114 | A1* | 7/2019 | Hamakawa | G06F 9/45558 |
| 2019/0294704 | A1* | 9/2019 | Shiozawa | G06F 3/0622 |
| 2020/0225895 | A1* | 7/2020 | Nishiyama | G09G 5/005 |

FOREIGN PATENT DOCUMENTS

JP   2005138531 A   6/2005

* cited by examiner

*Primary Examiner* — Frantz Bataille
(74) *Attorney, Agent, or Firm* — Carter, DeLuca & Farrell LLP (57) ABSTRACT

When a portable storage device is connected to a connector of an information processor provided with a plurality of functions, the information processor reads the unique identifier information of the connected portable storage device, specifies processing contents preliminarily associated with the read unique identifier information, and executes the specified processing contents.

10 Claims, 10 Drawing Sheets

| UNIQUE ID | AUTOMATIC FUNCTION EXECUTION UNNECESSARY FLAG | | SETTING FUNCTION | SETTING INFORMATION |
|---|---|---|---|---|
| | FOR DIRECT PRINTING | FOR SCANNING TO USB MEMORY | | |
| 001 | | O | DIRECT PRINT | "1", "A4", "DUPLEX PRINTING", "HIGH QUALITY", "4 IN 1", "/document/print_these_file_NNN.pdf" |

303

INFORMATION PROCESSING APPARATUS, CONTROL METHOD FOR THE INFORMATION PROCESSING APPARATUS, AND A STORAGE MEDIUM

BACKGROUND

Field

The present invention relates to an information processing apparatus, a control method for the information processing apparatus, and a storage medium.

Description of the Related Art

Conventionally, various image forming apparatuses have been proposed which perform image formation without a user instructing image formation processing by using a PC (personal computer) when a portable storage device such as a USB (Universal Serial Bus) memory is connected. For example, Japanese Patent Application Laid-Open No. 2005-138531 discloses a technique in which when a USB memory is connected to an image forming apparatus, if a file to be printed is stored in the USB memory, the file is automatically printed.

In recent years, devices having multiple functions, such as a multifunction printer (MFP) having a function of direct printing that prints data from a USB memory, scan to USB memory that scans and stores data to a USB memory, and the like, have been widely used. Therefore, there is a demand for simplifying various processes by using a USB memory in such a multifunctional apparatus.

However, according to the technique disclosed in Japanese Patent Application Laid-Open No. 2005-138531, in the device having multiple functions such as the MFP, functions other than printing cannot be performed automatically. Therefore, the user's effort is increased because a user's operation is required.

SUMMARY

According to an aspect of the present invention, an information processing apparatus comprising: a connector for connecting a portable storage device; at least one memory that stores instructions; and at least one processor that executes the instructions to perform: reading, when the portable storage device is connected with the connector, unique identifier information of the connected portable storage device; and acquiring information of processing pre-associated with the unique identifier information of the connected portable storage device that is read by the reading to execute processing based on the acquired information of the processing.

Further features of the present invention will become apparent from the following description of exemplary embodiments with reference to the attached drawings.

DESCRIPTION OF THE EMBODIMENTS

Hereinafter, an embodiment of the present invention will be described with reference to the drawings.

Figure 1:
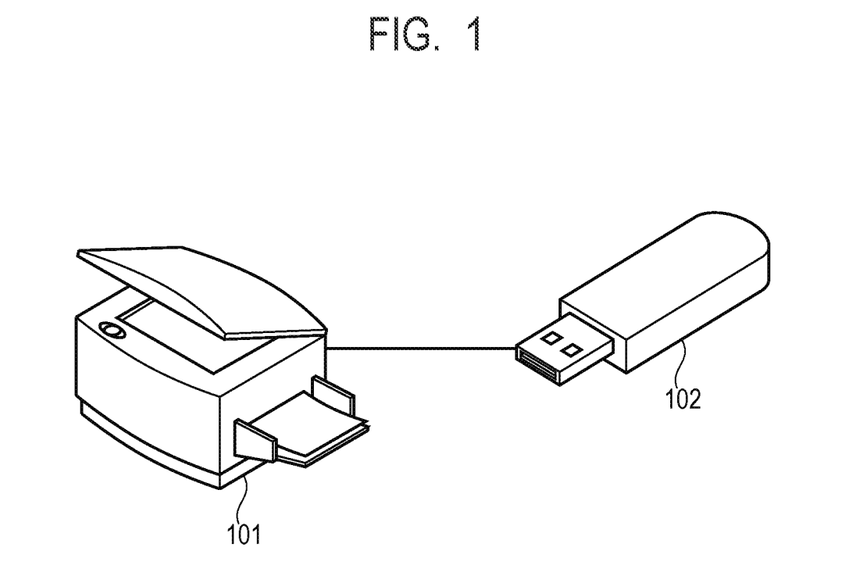
FIG. 1 is an overall view illustrating an example of a system configuration of an embodiment.

FIG. 1 is a diagram illustrating an example of the system configuration of this embodiment. This system comprises an image forming apparatus 101 and a USB memory 102. The image forming apparatus 101 is an example of an information processing apparatus and may be connected to the outside by a LAN such as the Internet, a WAN, a telephone line, a dedicated digital line, an ATM (Asynchronous Transfer Mode), or a frame relay line, a cable television line, a wireless line for data broadcasting, or a combination thereof.

The USB memory 102 is a device having a non-volatile memory capable of performing communication based on a communication system of the USB standard. The image forming apparatus 101 and the USB memory 102 can be bidirectionally connected via an input/output device 210 described later. In this embodiment, an example in which a USB memory is connected will be described, but other portable memories may be used as long as they have similar functions.

Figure 2:
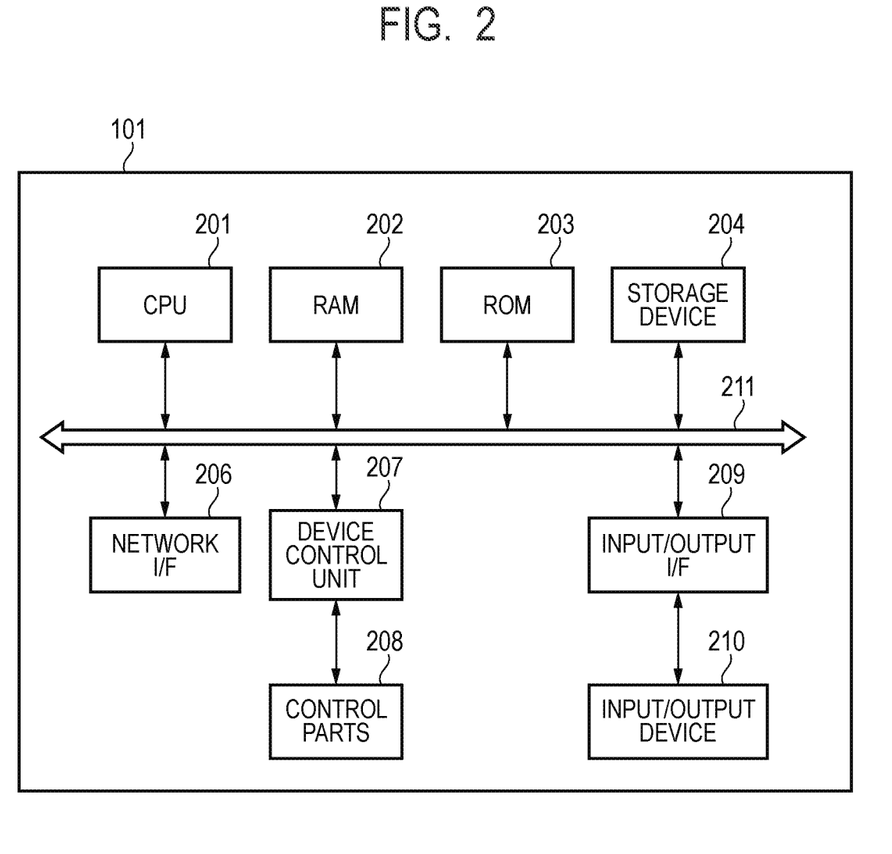
FIG. 2 is a block diagram illustrating an example of a hardware configuration of the image forming apparatus according to the embodiment.

FIG. 2 is a block diagram illustrating an example of the hardware configuration of the image forming apparatus 101. The image forming apparatus 101 can be applied to an image forming apparatus such as a digital multifunction device, a facsimile device, a laser beam printer, an inkjet printer, a scanner device, and the like. In this embodiment, an MFP is described as an example of the image forming apparatus. The image forming apparatus 101 includes a CPU 201, a RAM 202, a ROM 203, a storage device 204, a network I/F 205, a device control unit 207, an input/output I/F 209, and an internal bus 211. The CPU 201 is provided with a program stored in the ROM 203 (including a program for realizing respective processes described later), and generally controls each device via the internal bus 211. The RAM 202 functions as a memory and a work area of the CPU 201. The storage device 204 functions as an external storage device.

The CPU 201 executes a program using the RAM 202 and the ROM 203, and stores image data in a storage medium such as the storage device 204. The network I/F 205 exchanges data with an external network device in one direction or both directions. A device control unit 207 controls various control parts 208 of the device. The control parts 208 has a group of components for realizing various functions of the image forming apparatus 101 such as a printing part and a scanner part.

The input/output device 210 includes a plurality of configurations for performing input/output in the image forming apparatus 101. Specifically, the input/output device 210 receives an input (button input, etc.) from a user, and transmits a signal corresponding to the input to the aforementioned processing units via the input/output I/F 209. In addition, the input/output device 210 also includes a display device (such as a touch panel) for providing necessary information to the user or for receiving a user operation. The input/output device 210 also includes a configuration for performing communication based on a communication system of the USB standard. The USB memory 102 can perform bidirectional communication with the image forming apparatus 101 via the input/output device 210.

Figure 3:
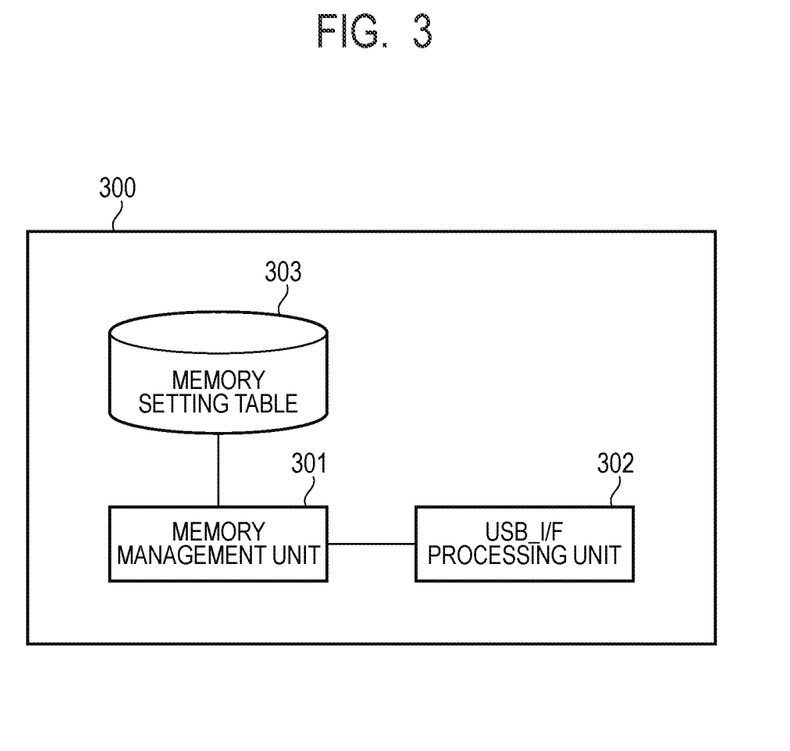
FIG. 3 is a block diagram illustrating an example of a software configuration of the image forming apparatus according to the embodiment.

FIG. 3 is a block diagram illustrating an example of the software configuration of the image forming apparatus 101. A program for realizing a function (module portion) in each software shown in FIG. 3 is stored in a ROM 203 of the image forming apparatus 101 or the like. The memory control module 300 performs processing when the USB memory 102 is attached to the input/output device 210 of the image forming apparatus 101. The memory control module 300 has a memory management unit 301, a USB_I/F processing unit 302, and a memory setting table 303. The memory management unit 301 manages the processing of the memory control module 300 and gives instructions to other modules (not shown).

Figure 10:
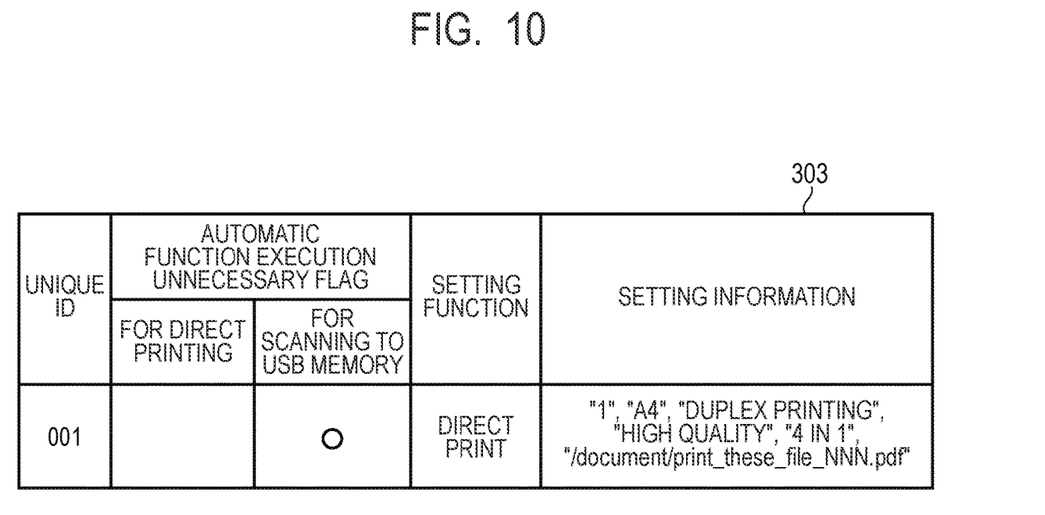
FIG. 10 is a diagram illustrating an example of the data configuration of the memory setting table according to the embodiment.

The USB_I/F processing unit 302 cooperates with the control related to USB communication of the input/output device 210 to attach or detach the USB memory 102, or to read or write to the USB memory 102. The memory setting table 303 is stored in the ROM 203 or the storage device 204. The unique ID of the USB memory, the automatic function execution unnecessary flag, the setting function, and the setting information are associated with each other and stored in the memory setting table 303. FIG. 10 shows an example of the data configuration of the memory setting table 303.

The unique ID of the USB memory may be information that can uniquely distinguish the USB memory, and for example, the serial number described on the device descriptor of the USB memory may be used as the unique ID. The automatic function execution unnecessary flag is a flag for determining whether or not the processing associated with the unique ID of the USB memory is automatically executed when the USB memory is mounted, and is prepared for each setting function. Specifically, in this embodiment, two flags for direct printing and scanning to USB memory are prepared for each record in the memory setting table 303.

Here, the direct print function is a function for transferring a file to the image forming apparatus 101 from the USB memory without using a printer driver, and recognizing and printing the file by the image forming apparatus 101. The scan to USB memory is a function for storing data read by the image forming apparatus 101 in the USB memory. The setting function is performed by the image forming apparatus 101, and in this embodiment, a direct print or scan to USB memory is set. The setting information is information indicating conditions and the like when the setting function is executed. In addition to the modules shown in FIG. 3, the image forming apparatus 101 includes software modules necessary for image forming and scanning such as a printing module and a scanning module.

Figure 4:
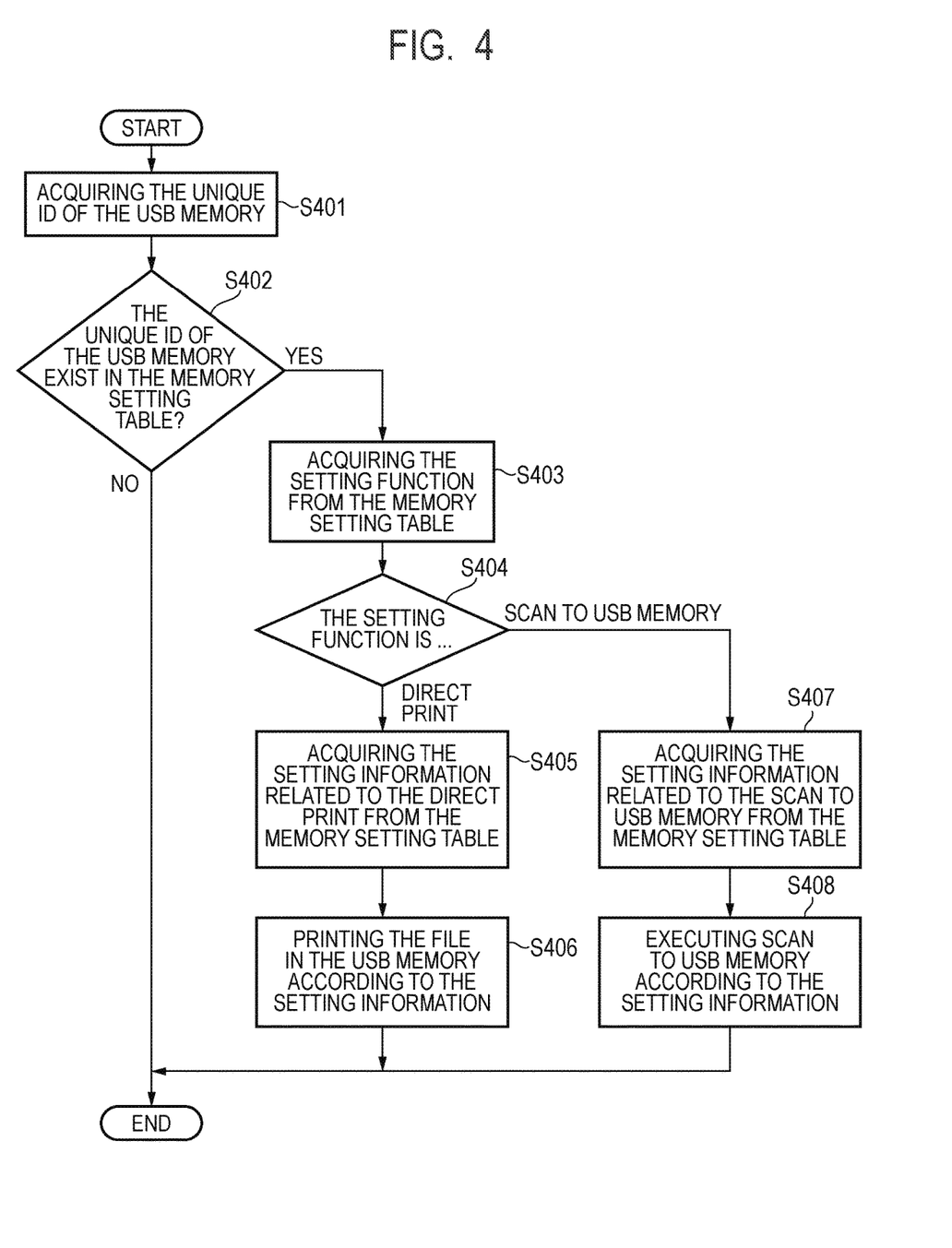
FIG. 4 is a flowchart illustrating an example of the USB memory detection processing procedure according to the embodiment.

Next, referring to the flowchart of FIG. 4, a process executed when the memory management unit 301 receives the USB memory attachment notification from the USB_I/F processing unit 302 will be described. It is assumed that the automatic function execution unnecessary flag is turned off for the record whose primary key is the unique ID of the USB memory to be mounted in this process. In step S401, the memory management unit 301 requests the USB_I/F processing unit 302 to acquire the unique ID of the USB memory.

In step S402, the memory management unit 301 determines whether or not a record having the unique ID acquired in step S401 as the primary key exists in the memory setting table 303. If the memory management unit 301 determines that there is a record whose primary key is the unique ID (Yes in S402), the process proceeds to step S403. On the other hand (No in S402), when the memory management unit determines that there is no record whose primary key is the unique ID, the memory management unit 301 terminates the present processing flow. In step S403, the memory management unit 301 acquires the setting function associated with the unique ID of the USB memory acquired in step S401 from the memory setting table 303.

In step S404, the memory management unit 301 determines whether the setting function acquired in step S403 is a direct print function or a scan to USB memory function. When it is determined that the setting function is a direct print, the memory management unit 301 proceeds the process to step S405. On the other hand, when it is determined that the setting function is the scan to USB memory, the memory management unit 301 proceeds the process to step S407. In step S405, the memory management unit 301 acquires setting information related to the direct print associated with the unique ID of the USB memory acquired in step S401 from the memory setting table 303. The setting information related to the direct printing includes, for example, the number of copies to be printed, the print size, and the path of the folder in which the print file is stored.

In step S406, the memory management unit 301 instructs the device control unit 207 to print according to the setting information about the direct print acquired in step S405. At this time, the memory management unit 301 may display the execution confirmation screen 700 of the function associated with the USB memory shown in FIG. 7 via the input/output device 210, and confirm with the user before printing is executed. The execution confirmation screen 700 of the function associated with the USB memory shown in FIG. 7 comprises a detailed setting field 701, an OK button 702, and a cancel button 703. A memory management unit 301 instructs printing when the OK button 702 is selected from a user, and does not instruct printing when the cancel button 703 is selected from the user. Further, the printing may be performed without checking with the user before performing printing.

In step S406, when performing direct printing, the file in the print folder path of the setting information is printed. The hash of the printed file may be acquired so as not to be printed in duplicate when the same USB memory is mounted again. Further, the setting information may include a flag indicating whether or not such a function for preventing duplicate printing is enabled, and the flag may be changed by the user. Further, when the USB memory is mounted and a file for which direct printing has been executed remains in the USB memory and processing is performed so as not to perform duplicate printing, the memory management unit 301 may notify the user of the file name for which processing has already been executed.

Figure 7:
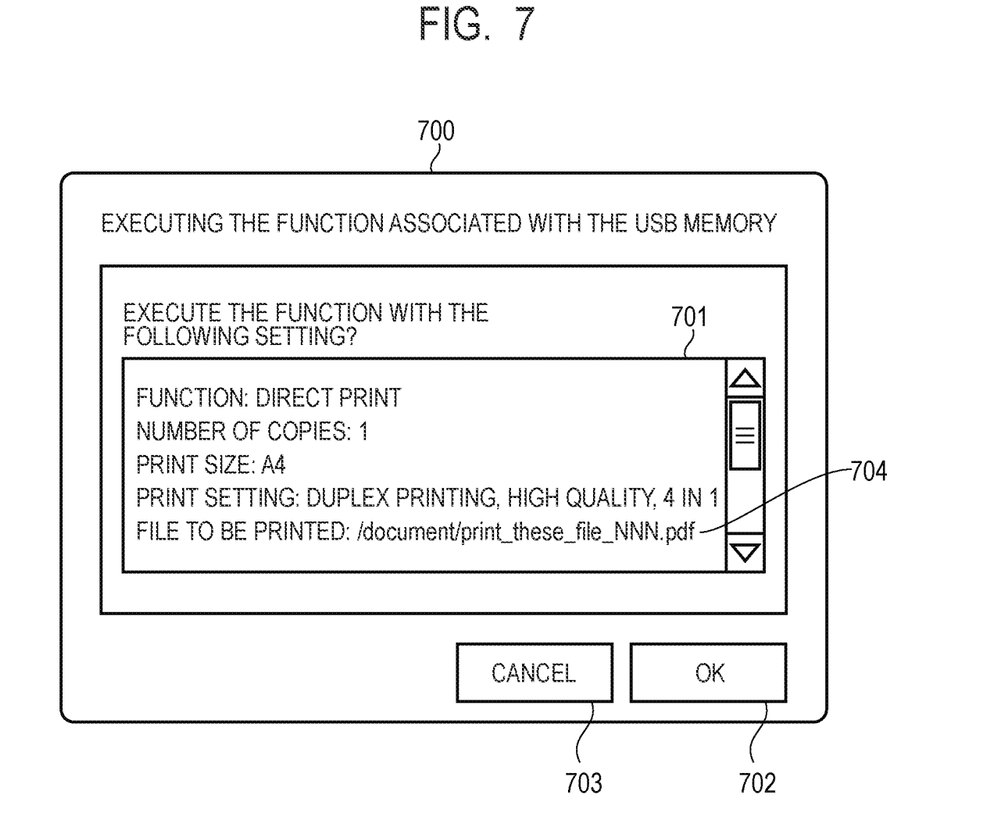
FIG. 7 is a view illustrating an example of an execution confirmation screen of a function associated with a USB memory according to the embodiment.

Further, for the file to be printed in step S406, a plurality of files may be selected by setting the print file path 704 in the detailed setting field 701 using wild cards or regular expressions. For example, if "/document/ print_these_file_\d{3}.pdf" is set as the print file path, files that match the sequential file path from /document/print_these_file_000.pdf to /document/print_these_file_999.pdf are printed.

In step S407, the memory management unit 301 acquires setting information related to the scan to USB memory associated with the unique ID of the USB memory acquired in step S401 from the memory setting table 303. The setting information related to the scan to USB memory includes, for example, the scan quality, the scan size, and the path of the folder in which the scanned file is saved. In step S408, the memory management unit 301 instructs the device control unit 207 to scan in accordance with the setting information of the scan to USB memory acquired in step S407. At this time, as described above in the description of step S406, a confirmation screen of the scan execution may be displayed to the user, and the user may be confirmed before the scan execution.

In step S408, the file path of the file storage destination to be scanned in the setting information may be set by using a wildcard or a regular expression. In this case, when the scan to USB memory is executed multiple times by the same USB memory, the file path of the scan file storage destination may be changed in accordance with a preset rule so that the file already stored in the USB memory 102 is not overwritten.

Figure 5:
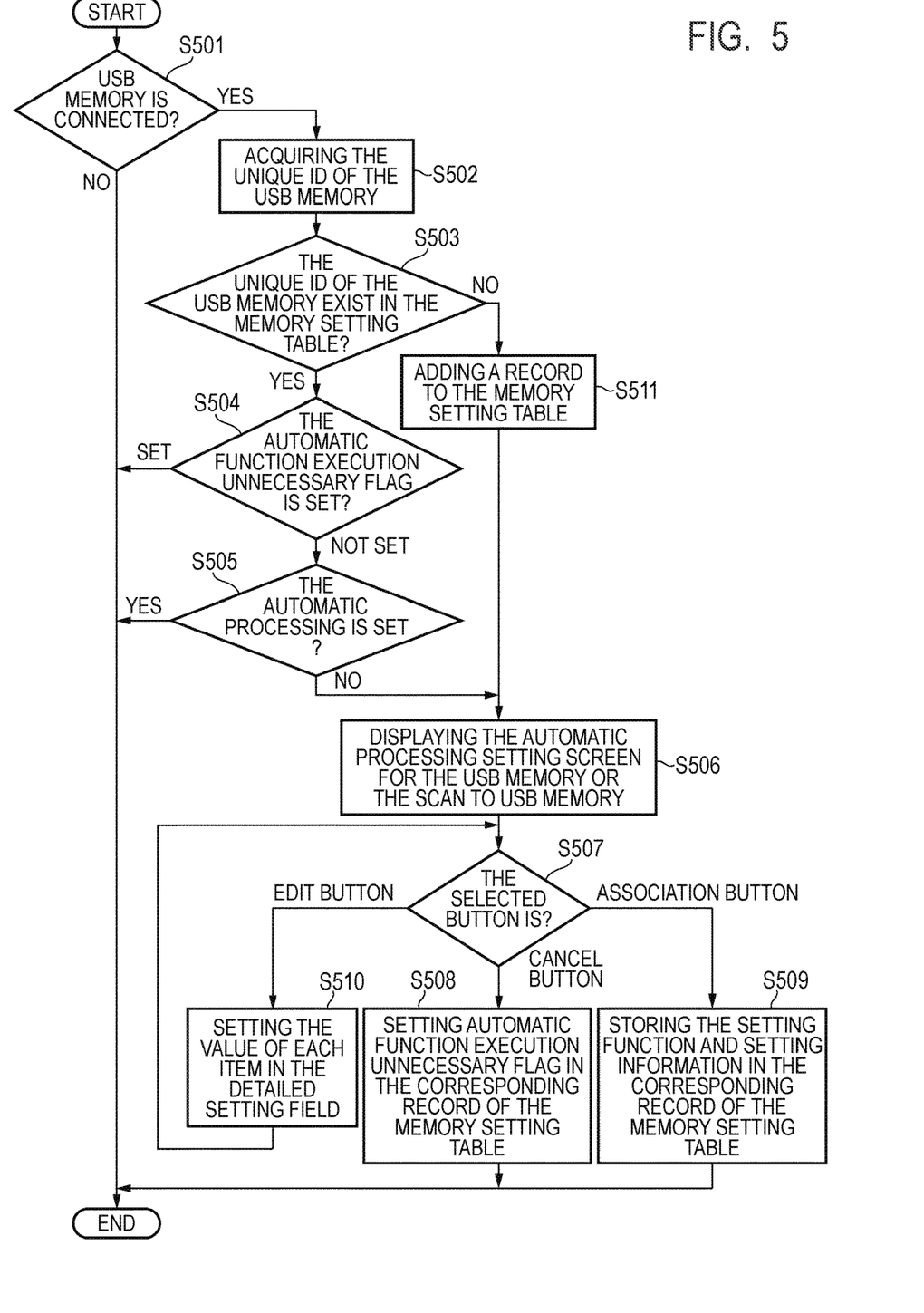
FIG. 5 is a flowchart illustrating an example of a processing procedure after executing a direct print or scan to USB memory according to the embodiment.
Figure 6:
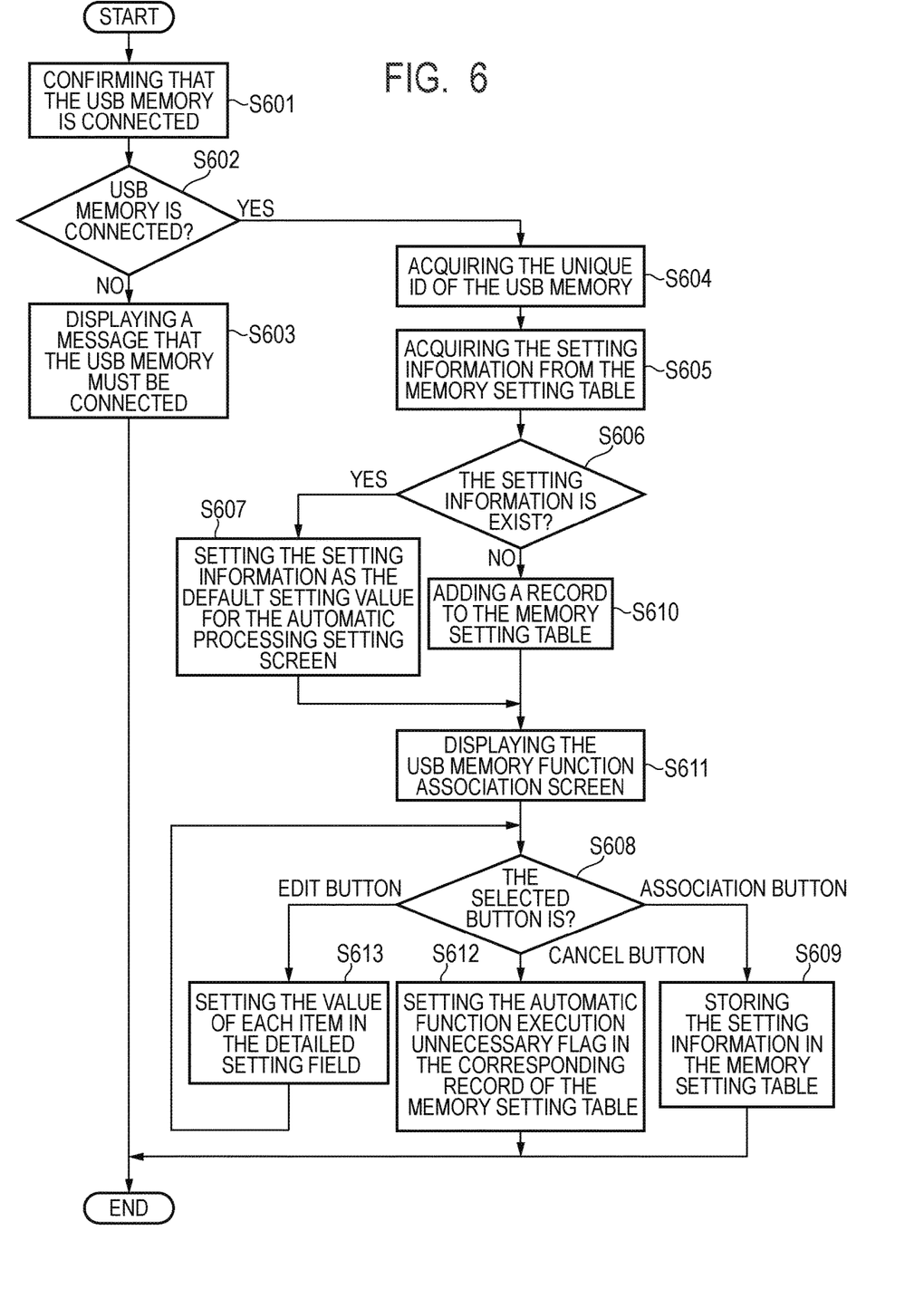
FIG. 6 is a flowchart illustrating an example of a USB memory association operation procedure according to the embodiment.

Next, as the processing for associating the setting information with the USB memory, the processing after executing the direct print or scan to USB memory and the USB memory association operation processing will be described with reference to the flowcharts of FIGS. 5 and 6, respectively. FIG. 5 is a flowchart illustrating an example of a processing procedure performed by the memory management unit 301 after the direct print or scan to USB memory is executed. First, in step S501, the memory management unit 301 inquires the USB_I/F processing unit 302 whether or not a USB memory is connected. If the USB memory is connected as a result of the inquiry (Yes in S501), the memory management unit 301 proceeds the process to step S502. On the other hand, if the USB memory is not connected (No in S501), the memory management unit 301 terminates this process.

In step S502, the memory management unit 301 acquires the unique ID of the connected USB memory from the USB_I/F processing unit 302. In step S503, the memory management unit 301 determines whether or not a record (hereinafter referred to as a corresponding record) having the unique ID of the USB memory acquired in step S401 as the primary key exists in the memory setting table 303. If it is determined that the corresponding record exists (Yes in S503), the memory management unit 301 proceeds the process to step S504. On the other hand, w % ben the memory management unit 301 determines that the corresponding record does not exist (No in S503), the process proceeds to step S511. In step S511, the memory management unit 301 adds a corresponding record to the memory setting table 303.

In step S504, the memory management unit 301 determines whether the automatic function execution unnecessary flag is set in the corresponding record of the memory setting table 303. When the memory management unit determines that the automatic function execution unnecessary flag of the setting function that triggered this process is set (Set in S504), the memory management unit 301 terminates this process. On the other hand, when the memory management unit 301 determines that the automatic function execution unnecessary flag is not set (Not Set in S504), the process proceeds to step S505.

In step S505, the memory management unit 301 determines whether or not the automatic processing of the setting function that triggered this processing is set in the corresponding record of the memory setting table 303. Specifically, for example, when the setting function that triggered this process is "direct print", the memory management unit 301 determines whether "direct print" is set to the setting function of the corresponding record in the memory setting table 303. In this embodiment, the memory management unit 301 determines the setting function, but may also determine the setting function and setting information. When the memory management unit 301 determines that the automatic processing of the triggered setting function is set (Yes in S505), the memory management unit 301 terminates the processing. On the other hand, when the memory management unit 301 determines that the automatic processing of the triggering setting function is not set (No in S505), the process proceeds to step S506.

Figure 8:
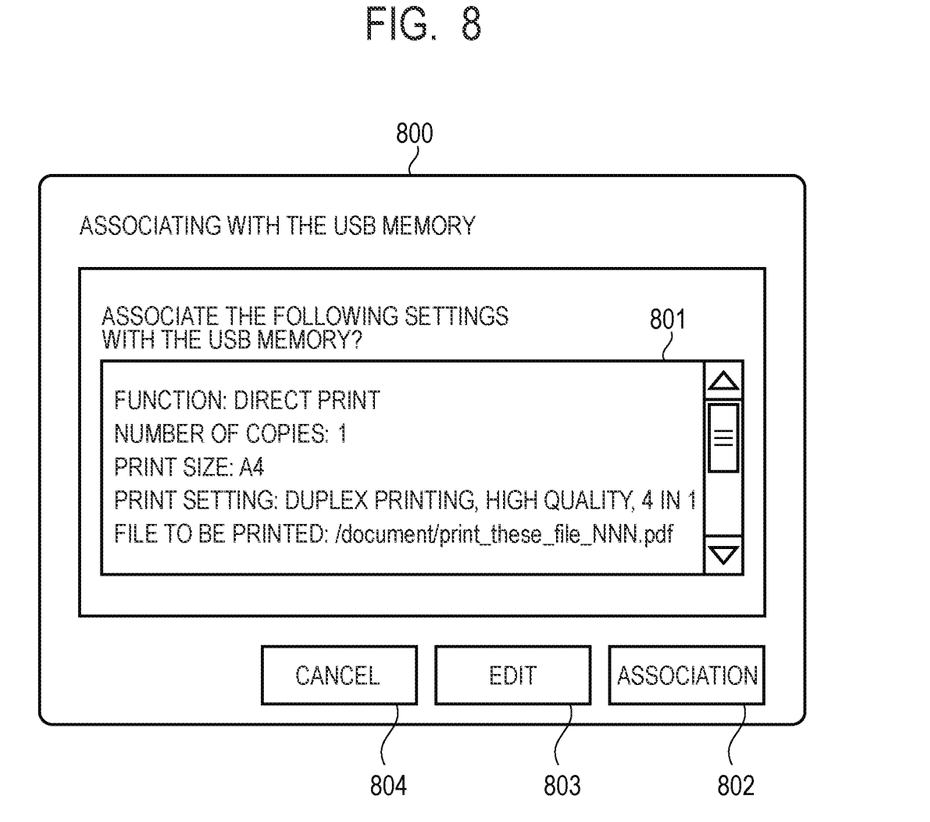
FIG. 8 is a view illustrating an example of an automatic processing setting screen according to the embodiment.

In step S506, the memory management unit 301 displays an automatic processing setting screen 800 illustrated in FIG. 8 to the user via the input/output device 210. FIG. 8 is a diagram illustrating an example of a screen for associating the executed setting function and setting information with the USB memory after each setting function is executed. The automatic processing setting screen 800 in FIG. 8 includes a detailed setting field 801, an association button 802, an edit button 803, and a cancel button 804. In the detailed setting field 801, a setting when a function triggered by this processing is used is set as a default setting value in advance. In step S507, the memory management unit 301 determines the button selected by the user on the automatic processing setting screen 800. If it is determined that the association button 802 is selected, the memory management unit 301 proceeds the process to step S509. If the memory management unit 301 determines that the cancel button 804 is selected, the process proceeds to step S508. If it is determined that the edit button 803 is selected, the memory management unit 301 proceeds the process to step S510.

In step S508, the memory management unit 301 sets an automatic function execution unnecessary flag of the setting function that triggered this process in the corresponding record of the memory setting table 303. In step S509, the memory management unit 301 stores the setting function and setting information set in the detailed setting field 801 of the automatic processing setting screen 800 displayed in step S506 in the corresponding record of the memory setting table 303. In step S510, the memory management unit 301 sets the value of each item in the detailed setting field 801 to an editable state. That is, the memory management unit 301 can set the value of each item of the detailed setting field 801 through the input/output device 210 by user operation.

Next, referring to the flowchart of FIG. 6 and FIG. 9, a process for associating the automatic processing with the USB memory independently will be described. The USB memory association operation process illustrated in FIG. 6 is executed when the user wants to actively associate a function with the USB memory, unlike the process after executing the direct print or scan to USB memory described above in the description of FIG. 5. The USB memory association operation process can be executed in the screen for changing the settings of the image forming apparatus 101.

First, in step S601, the memory management unit 301 instructs the USB_I/F processing unit 302 to confirm whether or not a USB memory is connected. Next, in step S602, the memory management unit 301 inquires the USB_I/F processing unit 302 about whether or not a USB memory is connected. If the USB memory is connected as a result of the inquiry (Yes in S602), the memory management unit 301 proceeds the process to step S604. On the other hand, if the USB memory is not connected (No in S602), the memory management unit 301 proceeds the process to step S603. In step S603, the memory management unit 301 displays a message to the user via the input/output device 210 that the user needs to connect the USB memory in order to associate the functions with the USB memory.

In step S604, the memory management unit 301 acquires the unique ID of the connected USB memory from the USB_I/F processing unit 302. In step S605, the memory management unit 301 acquires setting information associated with the unique ID of the USB memory acquired in step S604 from the memory setting table 303. In step S606, the memory management unit 301 determines whether or not the setting information associated with the unique ID of the USB memory exists in the memory setting table 303. If the memory management unit 301 determines that the setting information exists (Yes in S606), the process proceeds to step S607. In step S607, the memory management unit 301 sets the setting information acquired in step S605 as the default setting value in the detailed setting field 901 of the USB memory function association screen 900 and proceeds the process to step S611. On the other hand, when the memory management unit 301 determines that the setting information does not exist (No in S606), the process proceeds to step S610. In step S610, the memory management unit 301 adds the corresponding record to the memory setting table 303 and proceeds the process to step S611.

Figure 9:
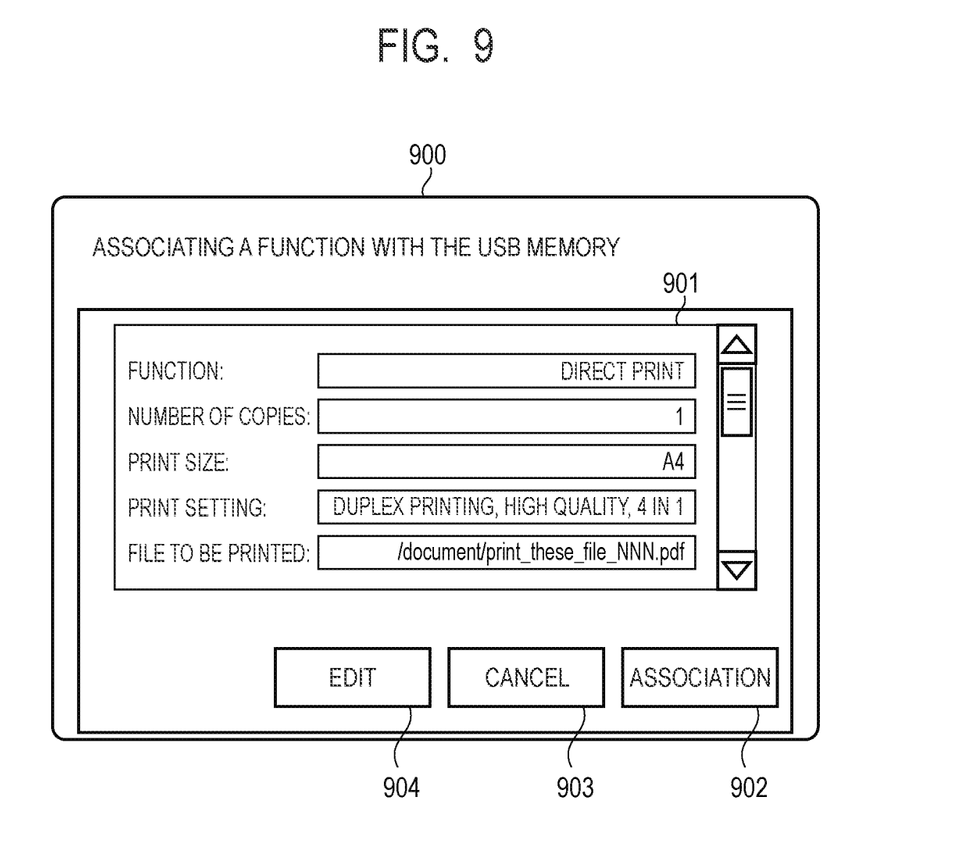
FIG. 9 is a view illustrating an example of a USB memory function association screen according to the embodiment.

In step S611, the memory management unit 301 displays the USB memory function association screen 900 of FIG. 9 via the input/output device 210 and proceeds the process to step S608. The USB memory function association screen 900 includes a detailed setting field 901, an association button 902, a cancel button 903, and an edit button 904.

In step S608, the memory management unit 301 determines the button selected by the user on the USB memory function association screen 900. When it is determined that the association button 902 is selected, the memory management unit 301 proceeds the process to step S609. If the memory management unit 301 determines that the edit button 904 is selected, the process proceeds to step S613. On the other hand, when the memory management unit 301 determines that the cancel button 903 is selected, the process proceeds to step S612.

In step S609, the memory management unit 301 stores the setting function and setting information set in the detailed setting field 901 of the USB memory function association screen 900 in the corresponding record of the memory setting table 303. When the automatic function execution unnecessary flag is set for the stored setting function, the memory management unit 301 turns off the automatic function execution unnecessary flag. In step S613, the memory management unit 301 sets the value of each item in the detailed setting field 901 to an editable state. That is, the memory management unit 301 can set the value of each item of the detailed setting field 901 through the input/output device 210 by user operation. In step S612, the memory management unit 301 sets the automatic function execution unnecessary flag of all the setting functions in the corresponding record of the memory setting table 303. Although the automatic function execution unnecessary flag of all the setting functions is set, if it is determined in step S606 that the setting information exists, the automatic function execution unnecessary flag may be set for the setting functions.

As described above, according to the present embodiment, the processing of the MFP is stored in association with the unique identification information of the USB memory, and the associated processing is performed when the USB memory is connected, thereby partially omitting the operation of the MFP in the business flow and reducing the labor of the user's operation.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-024214, filed Feb. 18, 2021, which is hereby incorporated by reference herein in its entirety.

What is claimed is:

1. An information processing apparatus comprising:
  a connector;
  at least one memory that stores instructions and setting information which is associated with unique identifier information, wherein the setting information indicate a setting for a predetermined processing; and
  at least one processor that executes the instructions to perform:
    receiving, from a portable storage device when the portable storage device is connected with the connector, unique identifier information that identifies the connected portable storage device;
    acquiring, from the at least one memory, the setting information associated with the received unique identifier information of the connected portable storage device; and
    executing the predetermined processing based on the acquired setting information.

2. The information processing apparatus according to claim 1, wherein the processor executes the instructions to further perform:

registering, in the at least one memory, the setting information associated with the received unique identifier information of the connected portable storage device based on a user's instruction.

3. The information processing apparatus according to claim 1, wherein the processor executes the instructions to further perform:

displaying, before executing the predetermined processing based on the acquired information, information based on the acquired information on a display.

4. The information processing apparatus according to claim 1, wherein the processor executes the instructions to further perform:

controlling, in a case where a file already executed by the predetermined processing based on the acquired information is stored in the memory, not to execute the predetermined processing based on the acquired information.

5. The information processing apparatus according to claim 2, wherein the processor executes the instructions to further perform:

a setting for information of the predetermined processing based on the acquired information in response to a user operation.

6. The information processing apparatus according to claim 5, wherein the setting is a setting of conditions for the processing associated with the received unique identifier information of the connected portable storage device.

7. The information processing apparatus according to claim 5, wherein the setting is a setting of a flag whether the predetermined processing based on the acquired information is executed or not.

8. The information processing apparatus according to claim 1, the portable storage device is a USB (Universal Serial Bus) memory.

9. A control method for an information processing apparatus including a connector, the control method comprising:

receiving, from a portable storage device when the portable storage device is connected with the connector, unique identifier information that identifies the connected portable storage device;

acquiring setting information associated with the received unique identifier information of the connected portable storage device; and executing a predetermined processing based on the acquired setting information.

10. A non-transitory computer-readable storage medium storing instructions that cause a computer including a connector to perform:

receiving, from a portable storage device when the portable storage device is connected with the connector, unique identifier information that identifies the connected portable storage device;

acquiring setting information associated with the received unique identifier information of the connected portable storage device; and executing a predetermined processing based on the acquired setting information.

\* \* \* \* \*